United States Patent
Muramatsu et al.

(10) Patent No.: US 7,075,246 B2
(45) Date of Patent: Jul. 11, 2006

(54) DISCHARGE LAMP ILLUMINATION CIRCUIT

(75) Inventors: Takao Muramatsu, Shizuoka (JP); Masayasu Ito, Shizuoka (JP)

(73) Assignee: Koito Manufacturing, Co., Ltd., Tokyo (JP)

( * ) Notice: Subject to any disclaimer, the term of this patent is extended or adjusted under 35 U.S.C. 154(b) by 0 days.

(21) Appl. No.: 10/915,079

(22) Filed: Aug. 10, 2004

(65) Prior Publication Data
US 2005/0062434 A1    Mar. 24, 2005

(30) Foreign Application Priority Data
Aug. 13, 2003  (JP)  ............... P. 2003-292713

(51) Int. Cl.
*H05B 37/02*    (2006.01)
(52) U.S. Cl. ............... 315/219; 315/209 R; 315/291; 315/224
(58) Field of Classification Search ............ 315/291, 315/224, 307, 219, 209 R, DIG. 7, 276, DIG. 2, 315/212, DIG. 5; 363/131–133
See application file for complete search history.

(56) References Cited
U.S. PATENT DOCUMENTS

| | | | |
|---|---|---|---|
| 5,068,570 A | 11/1991 | Oda et al. | 315/128 |
| 5,151,631 A | 9/1992 | Oda et al. | 315/127 |
| 5,233,273 A * | 8/1993 | Waki et al. | 315/224 |
| 5,406,471 A * | 4/1995 | Yamanaka | 363/124 |
| 5,495,405 A * | 2/1996 | Fujimura et al. | 363/133 |
| 5,714,845 A * | 2/1998 | Heering et al. | 315/174 |
| 5,742,497 A * | 4/1998 | Hashimoto et al. | 315/DIG. 7 |
| 6,034,487 A | 3/2000 | Yamashita et al. | 315/244 |
| 6,188,180 B1 | 2/2001 | Diamond | 315/289 |

FOREIGN PATENT DOCUMENTS

| | | |
|---|---|---|
| JP | 7-142182 | 6/1995 |
| JP | 7-169583 | 7/1995 |

OTHER PUBLICATIONS

Gulko et al., "A MHz Electronic Ballast for Automotive-Type HID Lamps," IEEE 1:39-45, Jun. 22, 1997.

* cited by examiner

*Primary Examiner*—Don Wong
*Assistant Examiner*—Ephrem Alemu
(74) *Attorney, Agent, or Firm*—Fish & Richardson P.C.

(57) ABSTRACT

A discharge lamp illumination circuit 1 has a DC-AC conversion circuit 3 which effects AC conversion and boosting upon receipt of a DC input, and a starter circuit 4 for supplying a start-up signal to a discharge lamp. Power output from the DC-AC conversion circuit 3 is controlled by control means 6, thereby controlling illumination of a discharge lamp 10. An AC transformer 7 constituting the DC-AC conversion circuit 3 is provided, and a primary circuit and a secondary circuit, both forming part of the AC transformer 7, are insulated from each other. The start-up signal boosted by the AC transformer 7 is superposed on the AC-converted output, and the resultant signal is supplied to the discharge lamp 10. Thus, the need for a starter transformer specifically designed for startup can be obviated.

6 Claims, 4 Drawing Sheets

DISCHARGE LAMP ILLUMINATION CIRCUIT

This application claims foreign priority based on Japanese Patent application No. 2003-292713, filed Aug. 13, 2003, the contents of which is incorporated herein by reference in its entirety.

TECHNICAL FIELD

The present disclosure addresses the problem of an increase in power loss or the like associated with an increase in the frequency of a discharge lamp illumination circuit.

BACKGROUND

One configuration of an illumination circuit of a discharge lamp (e.g., a metal halide lamp) includes a DC power supply circuit having a DC-DC converter, a DC-AC conversion circuit and a starter circuit. For example, a DC voltage output from a battery may be converted to a desired voltage in the DC power supply circuit, and is converted to an AC output in a subsequent DC-AC conversion circuit. A start-up signal (a so-called starter pulse) is superposed on the AC output, and a resultant signal is supplied to the discharge lamp (see, e.g., Japanese patent document JP-A-7-142182).

However, where a voltage is converted through two stages (i.e., a DC-DC voltage conversion and a DC-AC conversion), a circuit becomes unsuitable for miniaturization as it becomes larger in scale. Therefore, there is employed a configuration in which an output boosted through voltage conversion effected in a first stage of the DC-AC circuit is supplied to a discharge lamp (see, e.g., Japanese patent document JP-A-7-169583).

The foregoing configuration can suffer from a problem when the frequency of a starter circuit of the discharge lamp is increased.

For instance, when a secondary winding of a transformer (a so-called a starter transformer) constituting the starter circuit is connected in series to a discharge lamp, a loss in the transformer is increased when an output frequency of a DC-AC conversion circuit is increased, which, in turn, is responsible for a decrease in efficiency. An increase in an operating frequency (i.e., an operating frequency of a switching element constituting the DC-AC conversion circuit) is desirable for reducing the size of a circuit. Minimizing power loss in the starter circuit or the like also is desirable. A configuration in which the starter circuit effects boosting without use of a transformer can result in drawbacks such as a complicated circuit configuration being responsible for a cost hike or hindering miniaturization.

SUMMARY

The present disclosure realtes to a compact, inexpensive discharge lamp illumination circuit, wherein a DC-AC conversion circuit has the function of effecting AC conversion and boosting (including boosting of a start-up signal), and a circuit configuration suitable for increasing a frequency.

To address the problems discussed above, the present disclosure provides a discharge lamp illumination circuit having a DC-AC conversion circuit which effects AC conversion and boosting upon receipt of a DC input, a starter circuit for supplying a start-up signal to a discharge lamp, and control means for controlling illumination of the discharge lamp by means of controlling power output from the DC-AC conversion circuit. The discharge lamp illumination circuit may comprise an AC transformer (which constitutes the DC-AC conversion circuit and has a primary circuit) and a secondary circuit that are insulated from each other. A start-up signal boosted by the AC transformer is superposed on an AC-converted output, and a resultant signal is supplied to the discharge lamp.

The configuration of the discharge lamp illumination circuit can be provided with the following means.

- A plurality of switching elements constituting the DC-AC conversion circuit, a resonance capacitor, and an inductance component of an AC transformer which constitutes a resonance circuit in combination with the resonance capacitor or an inductance element connected to the resonance capacitor (which specifies a drive frequency of the switching elements to a resonance frequency or higher)
- A custom-designed winding which is provided on the AC transformer and to which an output terminal of the starter circuit is to be connected
- A rectifier element and a capacitor, which constitute the starter circuit, and a switching element connected to the capacitor (an output voltage produced when the switching element is brought into conduction at the time a rise in the voltage of the capacitor is applied to a primary winding or the custom-designed winding of the AC transformer).

The AC conversion and boosting may be effected by use of the AC transformer, and the AC transformer also may be utilized for boosting the start-up signal, whereby the circuit configuration is simplified (i.e., a starter transformer specifically designed for start-up is obviated).

One or more of the following advantages may be present in some implementations. For example, use of the starter transformer connected in series with the discharge lamp is not required, and the efficiency of the starter circuit can be enhanced by diminishing a loss associated with an increase in the operating frequency. Thus, the present invention is suitable for reducing the size of the circuit. Moreover, use of the AC transformer common to generation of a start-up voltage and power supply enables simplification of the circuit configuration, which is effective for curtailing costs.

By means of the configuration provided with the switching elements and the resonance capacitor, the drive frequency of the switching elements may be specified to a resonance frequency or higher, thereby ensuring control stability.

The start-up signal can be boosted by means of connecting the output terminal of the starter circuit to the primary winding or the custom-designed winding of the AC transformer. Moreover, a required high voltage (i.e., a start-up voltage) is obtained by utilizing a resonance voltage as an input to the starter circuit, which is effective for simplifying the circuit configuration and curtailing costs.

The drive frequency of the switching elements may be set to become higher after illumination of the discharge lamp as compared with the drive frequency obtained before generation of the start-up signal. As a result, a high voltage required to start the circuit may be generated before illumination of the discharge lamp, and illumination can be controlled efficiently after illumination of the discharge lamp.

The starter circuit may be configured from a rectifier element, a capacitor, and a switching element, whereby the circuit can be simplified.

DETAILED DESCRIPTION

Figure 1B:
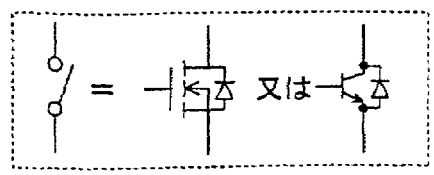
FIG. 1B is a diagram showing examples of semiconductor switching elements.
Figure 1A:
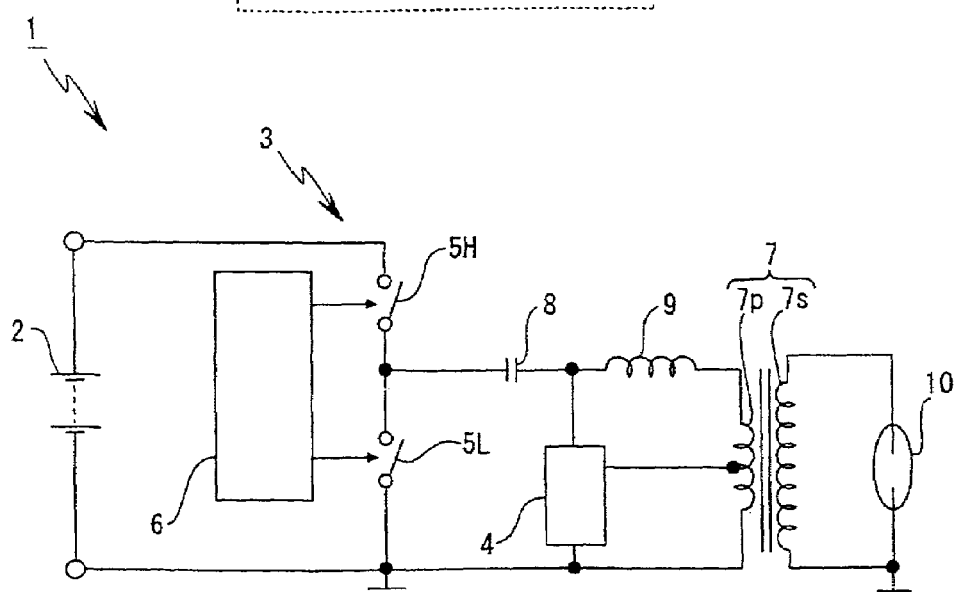
FIG. 1A illustrates an example of a basic configuration according to the present invention.

FIG. 1A shows an embodiment of the present invention, wherein a discharge lamp illumination circuit 1 includes a DC-AC conversion circuit 3 that receives power from a DC power source 2, and a starter circuit 4.

The DC-AC conversion circuit 3 is provided for effecting DC-AC conversion and boosting operation upon receipt of a voltage output directly from a battery or the like. In the embodiment, the DC-AC conversion circuit 3 includes two switching elements 5H and 5L, and control means 6 for driving the switching elements 5H and 5L to effect switching control operation. Specifically, one end of the switching element 5H on a higher stage is connected to a power supply terminal, and the other end of the switching element 5H is grounded via the switching element 5L on a lower stage. Further, the two switching elements 5H and 5L are alternately activated or deactivated by the control means 6. In FIG. 1A the switching elements 5H and 5L are simply denoted by a switch symbol; however, a semiconductor switching element, such as a field-effect transistor (FET) or a bipolar transistor, may be used for the elements 5H, 5L, as shown in areas surrounded by broken lines in FIG. 1B For instance, when FETs are used, activation or deactivation of the FETs is specified in accordance with a drive voltage supplied from the control means 6 to the gate. Since each of the FETs has a parasitic diode, an electric current achieved when the FETS are in an OFF state flows by way of the parasitic diodes. When bipolar transistors are used, a signal is supplied from the control means 6 to the base of the bipolar transistors, thereby specifying activation or deactivation of the transistors. So long as the diodes are connected in parallel to the transistors, an electric current—which is obtained when the bipolar transistors are in an OFF state—flows by way of the diodes.

The DC-AC conversion circuit 3 has an AC transformer 7 whose primary and secondary circuits are insulated from each other. The present embodiment uses a circuit configuration utilizing a resonance phenomenon between a resonance capacitor 8 and an inductor or inductance component 9. Specifically, the configuration pattern may include the following.

(I) a configuration which utilizes resonance between the resonance capacitor 8 and an inductance element;

(II) a configuration which utilizes resonance between the resonance capacitor 8 and a leakage inductance of the AC transformer 7; and (III) a configuration which utilizes resonance between the resonance capacitor 8, the inductance element, and the leakage inductance of the AC transformer 7.

The first configuration (I) may be configured as follows. An inductance element 9, such as a resonance coil, is provided actively. For example, one end of the inductance element 9 is connected to the resonance capacitor 8. The other end of the resonance capacitor 8 is connected to a node between the switching elements 5H and 5L. Further, the other end of the inductance element 9 is connected to a primary winding 7p of the AC transformer 7.

The second configuration (II) utilizes the inductance component 9 of the AC transformer 7, thereby obviating the need to add a resonance coil or the like. Specifically, the only requirement is to connect one end of the resonance capacitor 8 to the node between the switching elements 5H and 5L, and to connect the other end of the resonance capacitor 8 to the primary winding 7p of the AC transformer 7.

The third configuration (III) can utilize composite series reactance formed from the inductance element 9 and a leakage inductance.

In any of the above configurations, a discharge lamp 10 connected to a secondary winding 7s of the AC transformer 7 can be subjected to sinusoidal illumination on condition that the operating frequency of the switching elements is specified to a series resonance frequency or higher by utilizing series resonance between the resonance capacitor 8 and an inductive element (i.e., an inductance component or an inductance element) to activate or deactivate the switching elements 5H and 5L alternately. During drive control of the switching elements performed by the control means 6, the elements 5H and 5L should be activated alternately to prevent the two switching elements from being activated simultaneously (by way of an on-duty control). Here, provided that a series resonance frequency is denoted as "f"; an electrostatic capacity of the resonance capacitor 8 is denoted as "Lr"; and a primary-side inductance of the transformer 7 is denoted as "Lp1," for instance, in the third configuration (III), the following equation is satisfied before illumination of the discharge lamp $$f = f1 = 1/(2\cdot\pi\cdot\sqrt{Cr\cdot(Lr+Lp1)}),$$

and the following equation is satisfied after illumination of the discharge lamp $$f = f2 \approx 1/(2\cdot\pi\cdot\sqrt{Cr\cdot Lr}).$$

The present invention can be applied without regard for the configuration pattern assumed by the control means 6. For instance, the following configuration pattern or the like may be used. Specifically, a control voltage is specified by providing a circuit for controlling a no-load output voltage before illumination of the discharge lamp, or a circuit for controlling transient input power or input power in a steady state after illumination of the discharge lamp. A pulse signal obtained as a result of conversion of the voltage into a frequency through V(voltage)-F(frequency) conversion is shaped, and the shaped pulse signal is transmitted as a control signal to be delivered to the switching elements 5H, 5L.

The starter circuit 4 supplyies a start-up signal to the discharge lamp 10. An output from the starter circuit 4 on startup is boosted by the AC transformer 7, and the boosted voltage is supplied to the discharge lamp 10 (the output voltage having undergone AC conversion is superposed on the start-up signal, and thereafter supplied to the discharge lamp).

FIGS. 2 through 6 show a configuration example of the starter circuit 4, and the following configuration patterns.

Figure 3:
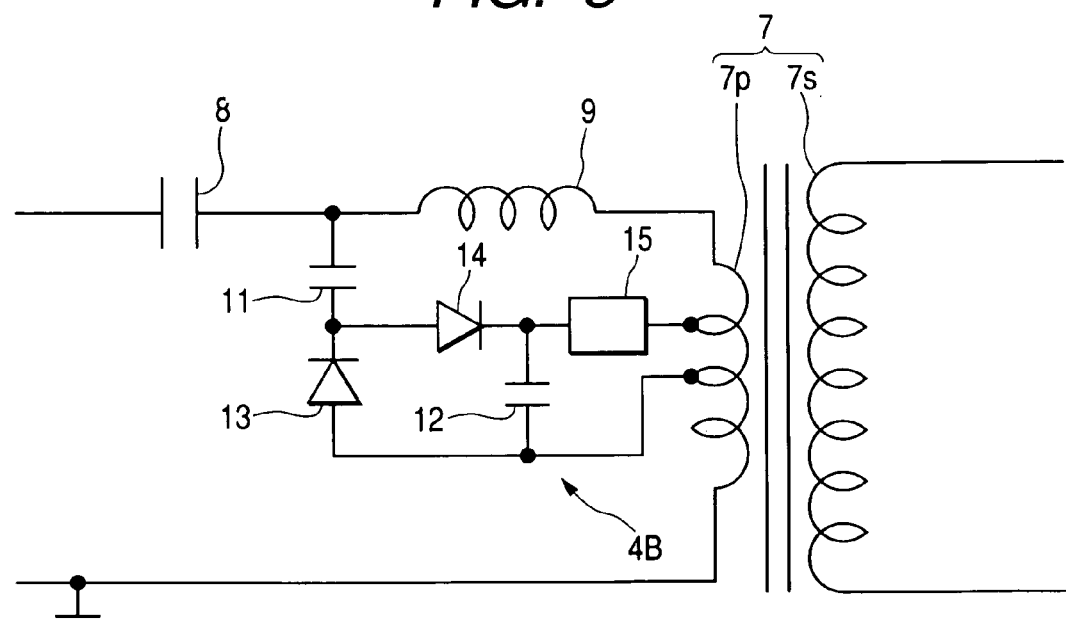
FIG. 3 illustrates another example of the starter circuit.
Figure 4:
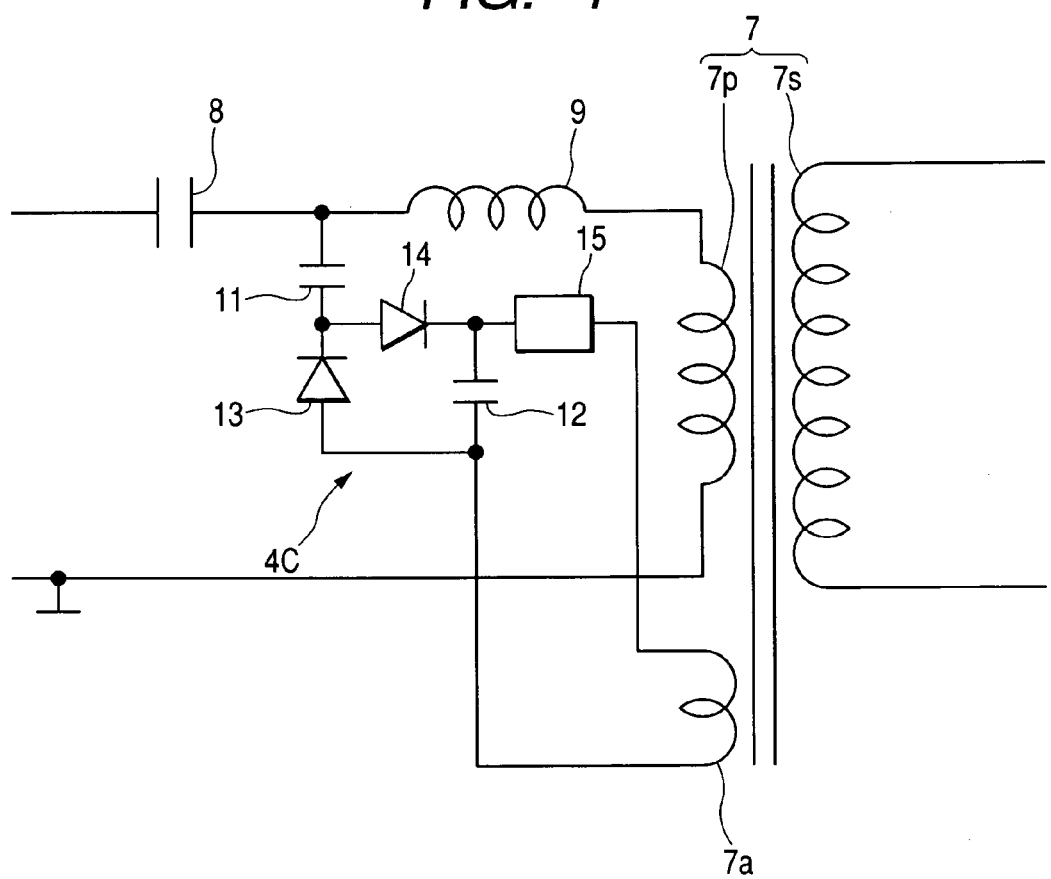
FIG. 4 illustrates an example configuration of the starter circuit using custom-designed winding provided on an AC transformer.

(A) A pattern in which an output terminal of the starter circuit is connected to any point on the primary winding of the AC conversion transformer (see FIGS. 2 and 3), and (B) A pattern in which the output terminal of the starter circuit is connected to a custom-designed winding provided on the AC conversion transformer (see FIG. 4).

In any configuration pattern, the start-up signal can be applied to the discharge lamp 10 from the secondary winding 7s of the AC transformer 7.

Figure 2:
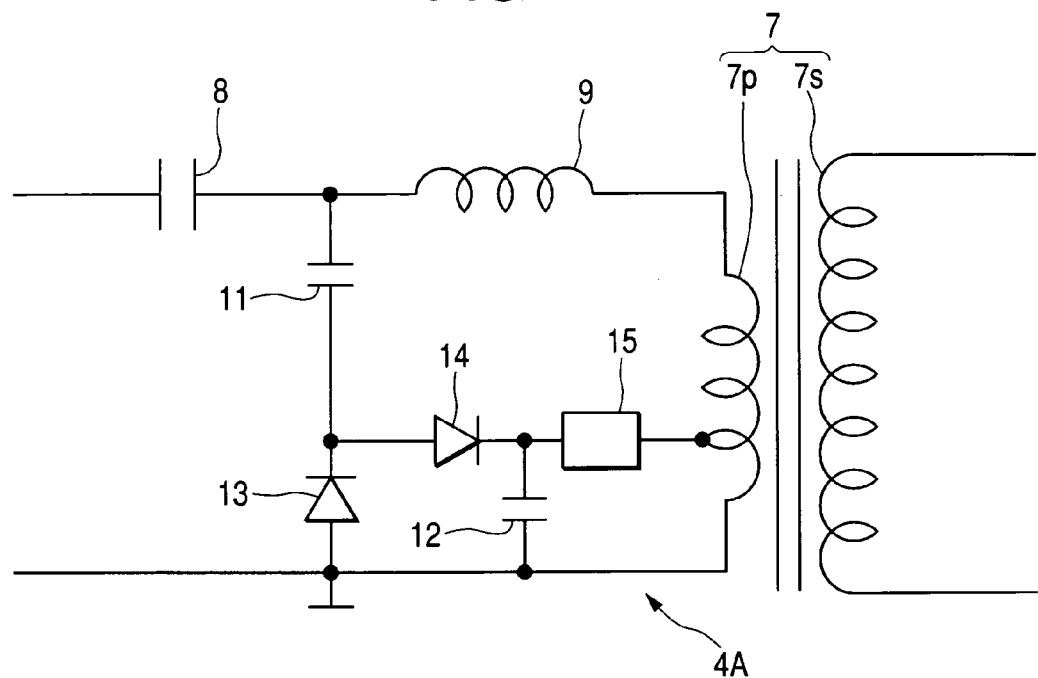
FIG. 2 illustrates an example circuit illustrating a configuration pattern of a starter circuit in combination with FIGS. 3 through 6.

For example, as shown in FIG. 2, the pattern (A) further includes a pattern in which one end of an output terminal of a starter circuit 4A is connected to an arbitrary point on the primary winding 7p of the AC transformer 7, and the other end of the output terminal is connected to one end (a ground-side terminal) of the primary winding 7p. As shown in FIG. 3, the pattern (A) also includes a pattern in which both output terminals of a starter circuit 4B are connected to arbitrary points on the primary winding 7p of the AC transformer 7.

Each of the starter circuits 4A, 4B includes rectifying elements and capacitors, and a switching element. A self-yielding element such as a spark gap, a varistor, a semiconductor element having a control terminal such as a thyristor, an IGBT (insulated gate bipolar transistor) or an FET can be used as the switching element. In the embodiment shown in FIGS. 2 and 3, each of the starter circuits 4A, 4B comprises two capacitors 11, 12, diodes 13, 14, and a switching element 15.

One end of the capacitor 11 is connected to a node between the resonance capacitor 8 and the inductance element 9 or the primary winding 7p including a leakage inductance component. The other end of the capacitor 11 is connected to the cathode of the diode 13 and the anode of the diode 14. The cathode of the diode 14 is connected to an arbitrary point on the primary winding 7p by way of the switching element 15 as well as to one end of the capacitor 12. In the embodiment shown in FIG. 2, the other end of the capacitor 12 and the anode of the diode 13 are connected to a ground-side terminal of the primary winding 7p. Moreover, in the embodiment shown in FIG. 3, the other end of the capacitor 12 and the anode of the diode 13 are connected to arbitrary points on the primary winding 7p. In any configuration, when the electric charges are shifted to the capacitor 12 by means of a charge pump circuit (a voltage doubler circuit) using a diode and a capacitor and thereafter the voltage across the capacitor increases to a certain threshold value, the switching element 15 is brought into conduction, whereupon the output voltage achieved at that time is applied to the primary winding 7p of the AC conversion transformer 7. The boosted start-up signal is applied to the discharge lamp 10, whereby the discharge lamp is illuminated.

When the number of turns of the winding between the output terminals (i.e., a portion of the primary winding 7p) is denoted as np and the number of turns of the secondary winding 7s of the AC transformer 7 is denoted as ns, the output of the starter circuit 4 is boosted by a factor of ns/np. For instance, in the case of a discharge lamp used as the light source for vehicle illumination, a pulse voltage of 20 kV or more must be generated on the secondary winding. For this reason, on the assumption that the pulse voltage output from the starter circuit is one kV, a boosting ratio of 1:20 or more is required. At the time of startup of the discharge lamp, such a high voltage is required, and hence the starter circuit has a structure in which the primary and secondary circuits of the AC transformer 7 are insulated from each other.

For example, as shown in FIG. 4, in the pattern (B), output terminals of a starter circuit 4C are connected to a custom-designed winding 7a which is smaller than the primary winding 7p in terms of the number of coils, thereby boosting an output voltage. Specifically, a structural difference between the starter circuit 4B shown in FIG. 3 and the starter circuit 4C is that one end of the switching element 15 is connected to one end of the custom-designed winding 7a, and a node between the capacitor 12 and the anode of the diode 13 is connected to the other end of the custom-designed winding 7a. The switching element 15 is brought into conduction when the voltage of the capacitor is boosted by means of shifting of the electric charges into the capacitor 12, and the output voltage achieved at that time is applied to the custom-designed winding 7a. The number of turns "np" corresponds to the number of turns of the custom-designed winding 7a, and the output of the starter circuit 4c is boosted by a factor of ns/np. The start-up signal is applied to the discharge lamp 10, thereby illuminating the discharge lamp.

Although in each embodiment one of the input terminals of the starter circuit also serves as the output terminal, the other input terminal is connected to a node between the resonance capacitor 8 and the inductance element 9 or to a node between the resonance capacitor 8 and the primary winding 7p of the AC transformer 7, whereby a resonance voltage can be input to the starter circuit.

In order to generate, on the secondary winding of the AC transformer 7, a pulse voltage having a peak-to-peak value required to activate the discharge lamp 10, the highest possible voltage must be supplied to the capacitor provided in the starter circuit 4, to recharge the capacitor. When the recharging voltage is low, the boosting ratio should be increased, which also involves increasing a winding ratio. Therefore, difficulty is encountered in obtaining a pulse having an ideal peak-to-peak value, or there arises a problem of an increase in ohmic loss (or rendering the winding thick to thereby reduce a power loss results in a bulky transformer). For this reason, a high voltage can be obtained by utilization of an existing circuit element, so long as a resonance voltage formed by the resonance capacitor 8 and the leakage inductance of the AC transformer 7 or the inductance element is input to the starter circuit 4. Thus, input of the resonance voltage is effective for simplifying the circuit configuration and curtailing costs.

In order to stabilize control of the discharge lamp after the discharge lamp has been illuminated by generating the start-up signal (i.e., the pulse voltage), the operating frequency of the switching elements 5H, 5L achieved before application of the start-up signal preferably is made higher than the operating frequency achieved after illumination of the discharge lamp. The secondary circuit of the AC conversion transformer 7 is opened before the discharge lamp is illuminated by application of the start-up signal, whereby the transformer is deemed equivalent to a choke coil. The series resonance frequency f1 achieved in this state is lower than the frequency f2 achieved during illumination. The switching elements are controlled by means of the operating frequency in the neighborhood of f1. After illumination of the discharge lamp, the switching elements are controlled by the operating frequency, which is in the neighborhood of the series resonance frequency f2, and determined by the electrostatic capacitance of the resonance capacitor 8 and the leakage inductance of the AC transformer 7 or the inductance of the inductance element (or a composite inductance consisting of these inductances).

During power control operation, switching control is preferably performed at an operating frequency which is higher than the series resonance frequency. When the operating frequency is made to coincide with the series resonance frequency, the maximum power is extracted. Therefore, illumination of the discharge lamp can be quickly shifted to a steady state by supplying the power to the discharge lamp as initial power to promote illumination of the discharge lamp. When switching control operation is performed with an operating frequency, which is lower than the series resonance frequency, a composite impedance consisting of the electrostatic capacitance of the resonance capacitor and the inductance enters a capacitative region, whereby the starter circuit becomes difficult to control. Therefore, the operating frequency (switching frequency) preferably is controlled so as to avoid occurrence of such a situation.

For instance, the operating frequency at a frequency higher than f1 is caused to approach f1 before illumination of the discharge lamp. After the discharge lamp has been illuminated by the start-up signal, it is desirable to cause the operating frequency to approach f2 (>f1) in order to supply power to the discharge lamp efficiently, in view of miniaturization of the circuit scale and cost reduction.

In the configuration patterns of the starter circuit discussed above, the resonance voltage is applied to the input terminals of the starter circuit. However, application of the present invention is not limited to such a circuit.

For instance, as mentioned previously, a high voltage should be applied to the input terminals of the starter circuit. When the voltage is low (i.e., when a rated voltage is low or in a situation where an actual voltage is lower than the rated voltage), an increase in a power loss or the rating or withstand voltage of the elements is induced by the need to increase the resonance current, thereby inducing a problem of an increase in circuit scale or cost. When the discharge lamp is illuminated, the primary current of the AC transformer is determined by the number of turns of the primary and secondary windings of the transformer or the secondary current (i.e., a lamp current). The smaller the inductance component formed by the resonance capacitor and the transformer or the composite inductance consisting of the inductance of the transformer and the inductance of the inductance element, the smaller the power loss can be made. However, if the inductance is made too small, there may arise a case where the resonance voltage (an input voltage to the starter circuit) achieved before illumination of the discharge lamp fails to become sufficiently high. Hence, the resonance current must be increased, which in turn leads to an increase in power loss. Alternatively, when the resonance voltage is low, the number of circuit stages (charge pump circuits), each consisting of the capacitor and the diode provided in the starter circuit, or the boosting ratio of the start-up signal must be increased, which complicates the circuit configuration or results in a bulky transformer.

Therefore, if the low level of the voltage presents a problem, the following configuration patterns may be provided.

Figure 5:
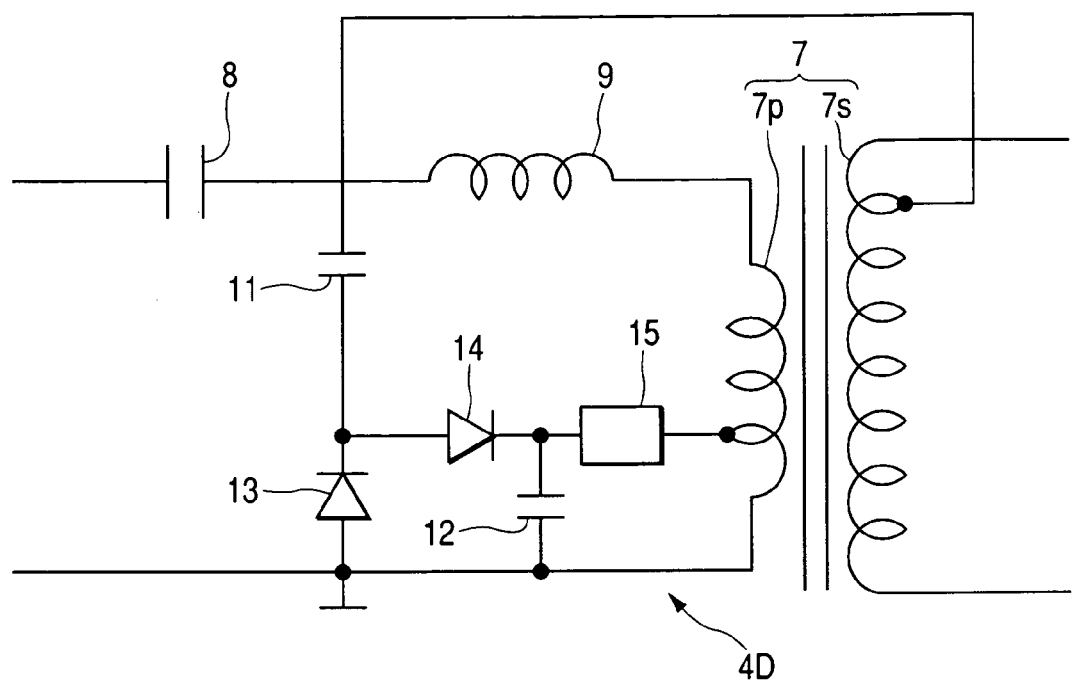
FIG. 5 illustrates an example configuration in which an input voltage is supplied from a secondary side of the AC transformer to the starter circuit.
Figure 6:
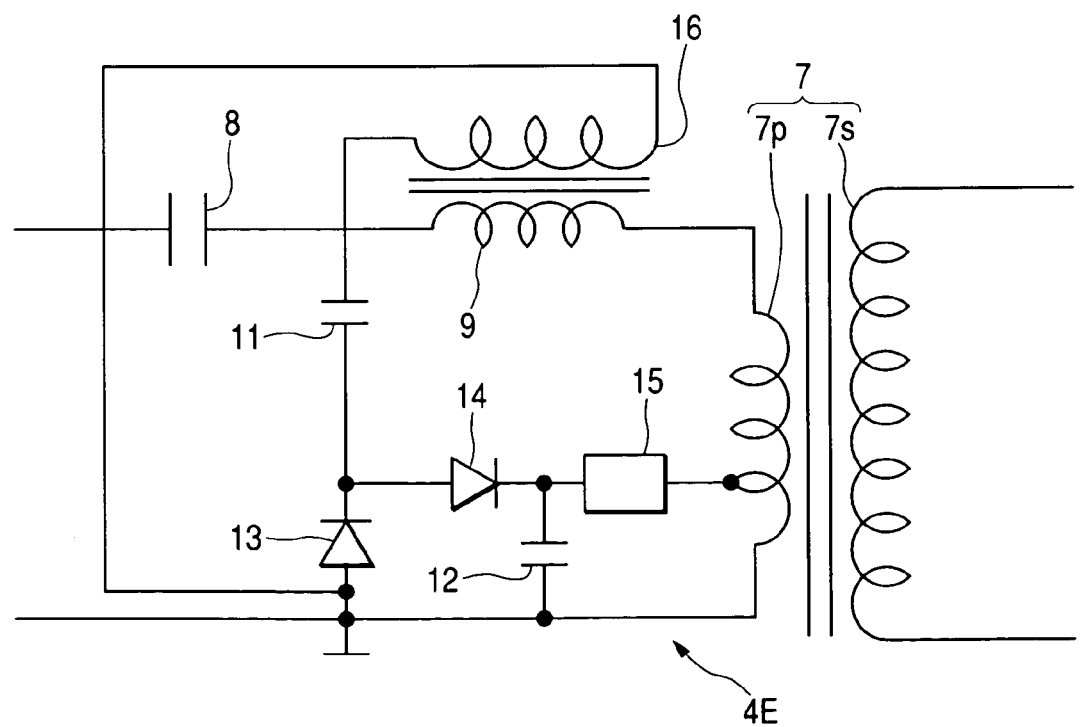
FIG. 6 illustrates an example configuration of the starter circuit in which the input voltage is supplied to the starter circuit through use of an inductance element and an auxiliary winding.

(a) A configuration pattern in which a voltage is input to the starter circuit from the secondary circuit of the AC conversion transformer (see FIG. 5); and (b) A configuration pattern in which there is provided an auxiliary winding which constitutes a transformer in combination with the inductance element connected to the resonance capacitor, and in which a voltage is input to the starter circuit from the auxiliary winding (see FIG. 6).

As shown in FIG. 5, in the configuration pattern (a), one of the input terminals of a starter circuit 4D is connected to an arbitrary point on the secondary winding 7s of the AC transformer 7 or one end of the secondary winding (non-ground terminal). The internal configuration of the starter circuit 4D shown in the embodiment is identical with that of the starter circuit of the embodiment shown in FIG. 2. Therefore, one end of the capacitor 11 is connected to the secondary winding 7s, whereby the capacitors 11, 12 are recharged. In the present embodiment, one of the output terminals of the starter circuit 4D is connected to an arbitrary point on the primary winding 7p, and the remaining output terminal is connected to the ground-side terminal of the primary winding 7p. However, the connection is not limited to this pattern. Both output terminals of the starter circuit may be connected to arbitrary points on the primary winding as shown in FIG. 3, or the output terminal may be connected to the custom-designed winding 7a as shown in FIG. 4. In any event, the maximum current value flowing through the circuit is decreased to lessen the load on the circuit, thereby lowering the power loss. The circuit scale can be reduced, which is advantageous to miniaturization or cost reduction.

As shown in FIG. 6, in the configuration pattern (b), the resonance inductance element 9 is provided with an auxiliary winding 16, thereby connecting both ends of the winding to the respective input terminals of a starter circuit 4E. The internal configuration of the starter circuit 4E described in the present embodiment is identical with that of the starter circuit of the embodiment shown in FIG. 2. Therefore, one end of the capacitor 11 is connected to one end of the auxiliary winding 16, and the other end of the winding is connected to the anode of the diode 13. The capacitors 11, 12 of the starter circuit 4E are recharged by the voltage boosted through use of the inductance element 9 and the auxiliary winding 16. In the present embodiment, one of the output terminals of the starter circuit 4E is connected to an arbitrary point on the primary winding 7p, and the other output terminal is connected to the ground-side terminal of the primary winding 7p. However, the connection is not limited to this pattern. Both output terminals of the starter circuit may be connected to arbitrary points on the primary winding as shown in FIG. 3, or the output terminal may be connected to the custom-designed winding 7a as shown in FIG. 4. In any event, the voltage input to the starter circuit can be freely designed by means of settings pertaining to the number of turns of the auxiliary winding 16. The number of components is increased by one by addition of the auxiliary winding 16. However, the need for designing a circuit in consideration of influence on the input voltage stemming from generation of the start-up signal is obviated.

What is claimed is:

1. A discharge lamp illumination circuit comprising:
   a DC-AC conversion circuit which effects AC conversion and boosting upon receipt of a DC input,
   a starter circuit for supplying a start-up signal to a discharge lamp, and
   control means for controlling illumination of the discharge lamp by means of controlling power output from the DC-AC conversion circuit, wherein the DC-AC conversion circuit comprises an AC transformer that includes a primary circuit and a secondary circuit, which are insulated from each other, wherein the start-up signal boosted by said AC transformer is superposed on an AC-converted output, and a resultant signal is supplied to the discharge lamp, and wherein the DC-AC conversion circuit further comprises a plurality of switching elements and a resonance capacitor, and said switching elements are activated by the control means to affect serial resonance between said resonance capacitor and either an inductance component of said AC transformer or an inductance component connected to said resonance capacitor wherein one end of the resonance capacitor is connected to a node between the switching elements and the other end thereof is connected to the inductance component.

2. The discharge lamp illumination circuit according to claim 1 adapted so that a drive frequency of said switching elements obtained after illumination of said discharge lamp is higher than a drive frequency of said switching element obtained before illumination of said discharge lamp.

3. The discharge lamp illumination circuit according to claim 1 wherein an input terminal of said starter circuit is electrically connected to a node between said resonance capacitor and said AC conversion transformer or to a node between said AC conversion transformer and said inductance element, thereby inputting a resonance voltage of said DC-AC conversion circuit to said starter circuit.

4. A discharge lamp illumination circuit comprising:
a DC-AC conversion circuit which affects AC conversion and boosting upon receipt of a DC input,
a starter circuit for supplying a start-up signal to a discharge lamp, and
control means for controlling illumination of the discharge lamp by means of controlling power output from the DC-AC conversion circuit,
wherein the discharge lamp illumination circuit comprises an AC transformer that includes a primary circuit and a secondary circuit, which are insulated from each other, wherein the start-up signal boosted by said AC transformer is superposed on an AC-converted output, and a resultant signal is supplied to the discharge lamp, and
wherein an output terminal of said starter circuit is connected to an arbitrary point on a primary winding of said AC transformer or a custom-designed winding provided on said AC transformer as a winding which has a smaller number of coils than does said primary winding; and said start-up signal is applied to said discharge lamp from said secondary winding of said AC conversion transformer.

5. The discharge lamp illumination circuit according to claim 4 wherein an input terminal of said starter circuit is electrically connected to a node between said resonance capacitor and said AC conversion transformer or to a node between said AC conversion transformer and said inductance element, thereby inputting a resonance voltage of said DC-AC conversion circuit to said starter circuit.

6. A discharge lamp illumination circuit comprising:
a DC-AC conversion circuit which affects AC conversion and boosting upon receipt of a DC input,
a starter circuit for supplying a start-up signal to a discharge lamp, and
control means for controlling illumination of the discharge lamp by means of controlling power output from the DC-AC conversion circuit,
wherein the discharge lamp illumination circuit comprises an AC transformer that includes a primary circuit and a secondary circuit, which are insulated from each other, wherein the start-up signal boosted by said AC transformer is superposed on an AC-converted output, and a resultant signal is supplied to the discharge lamp, and
wherein said starter circuit comprises a rectifier element, a capacitor, and a switching element connected to said capacitor; and wherein an output voltage produced when said switching element is brought into conduction at the time of boosting of the voltage of said capacitor is applied to a primary winding or said custom-designed winding of said AC transformer.

* * * * *